Aug. 9, 1938.  P. LANDROCK ET AL  2,126,479
PHOTOGRAPHIC APPARATUS
Filed April 2, 1936   5 Sheets-Sheet 5
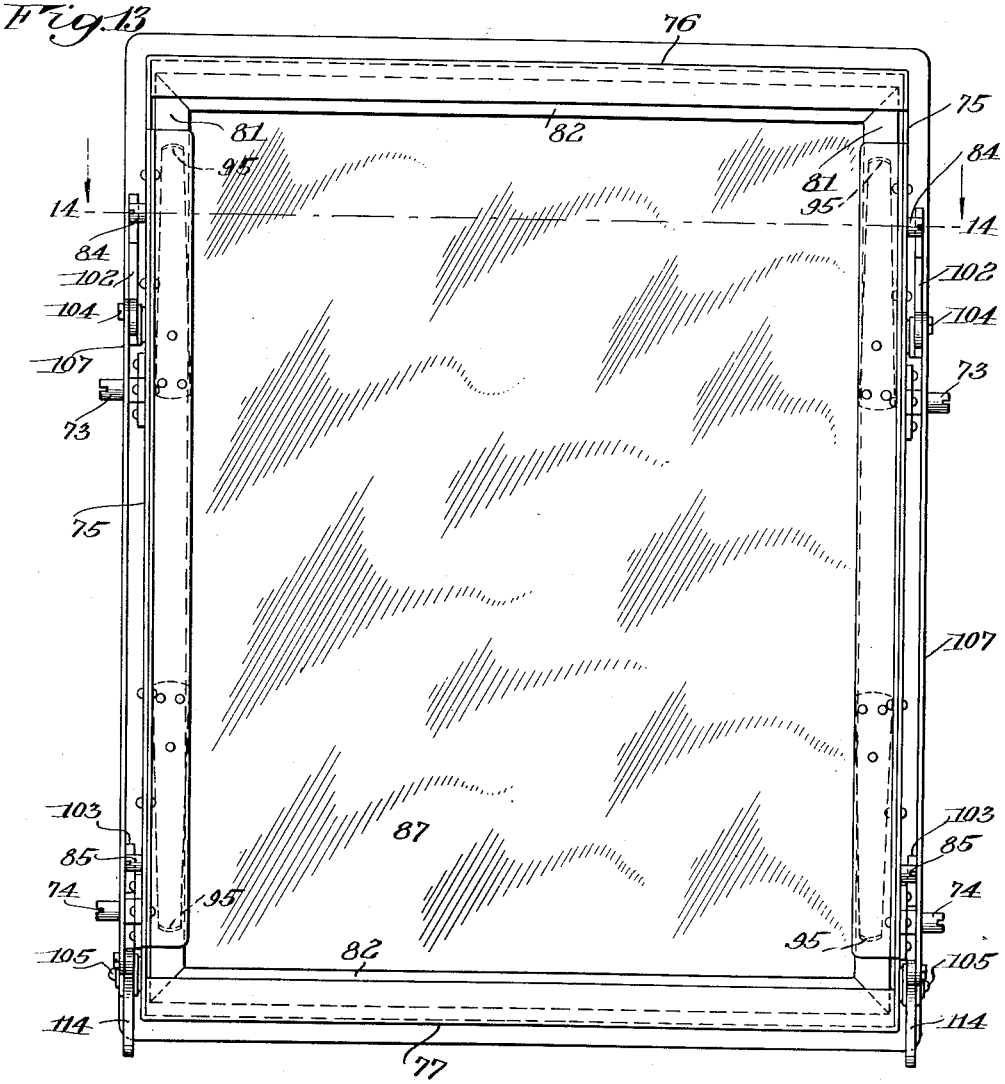
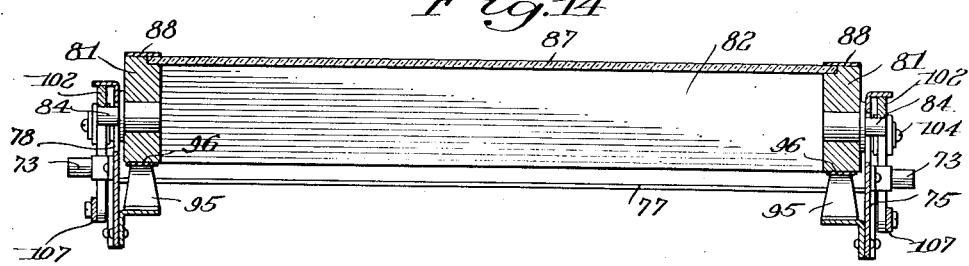
INVENTORS
Paul Landrock
BY Blackwell K. Murchison
Edward L. Cumpston
Their ATTORNEY.

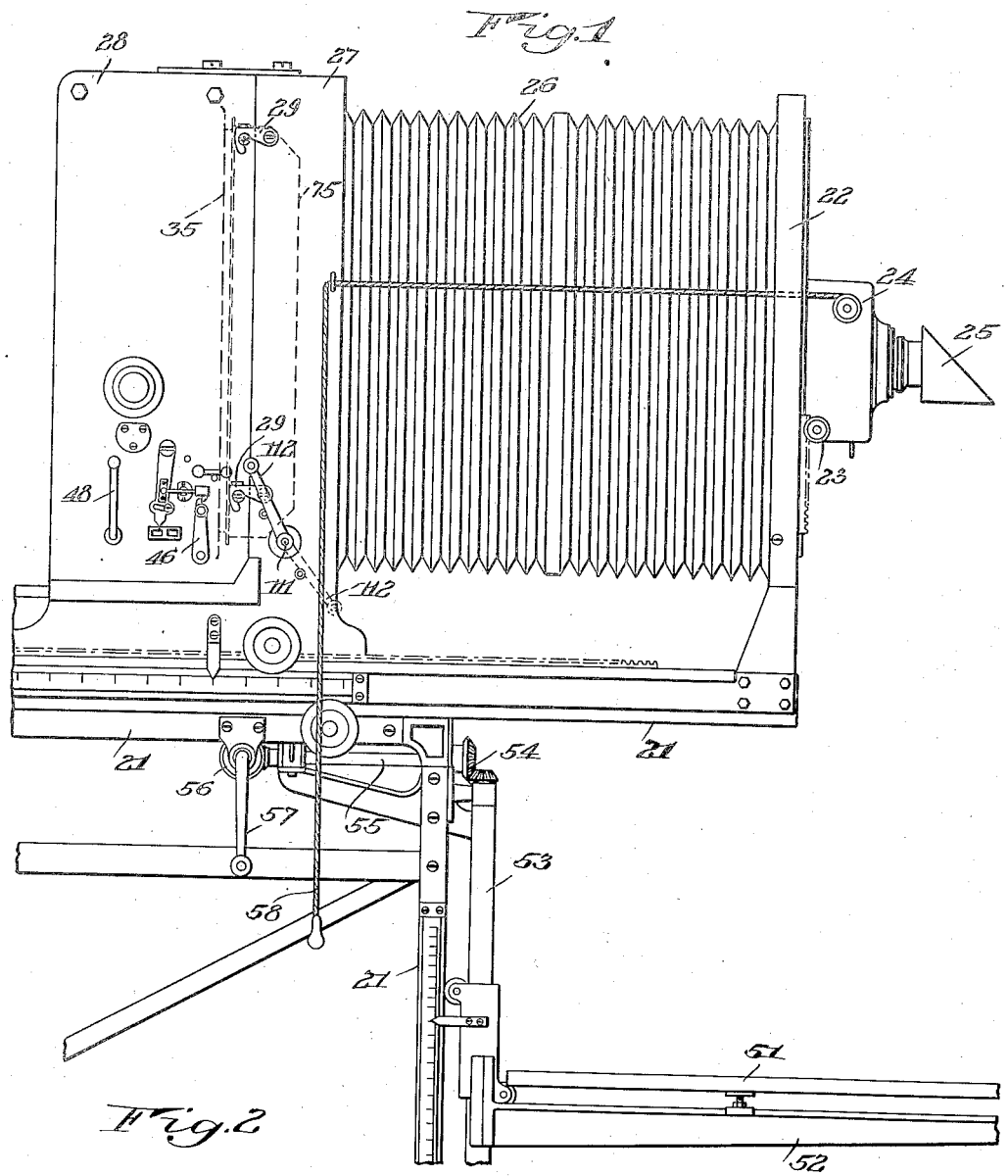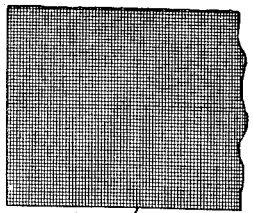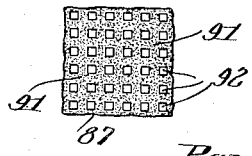

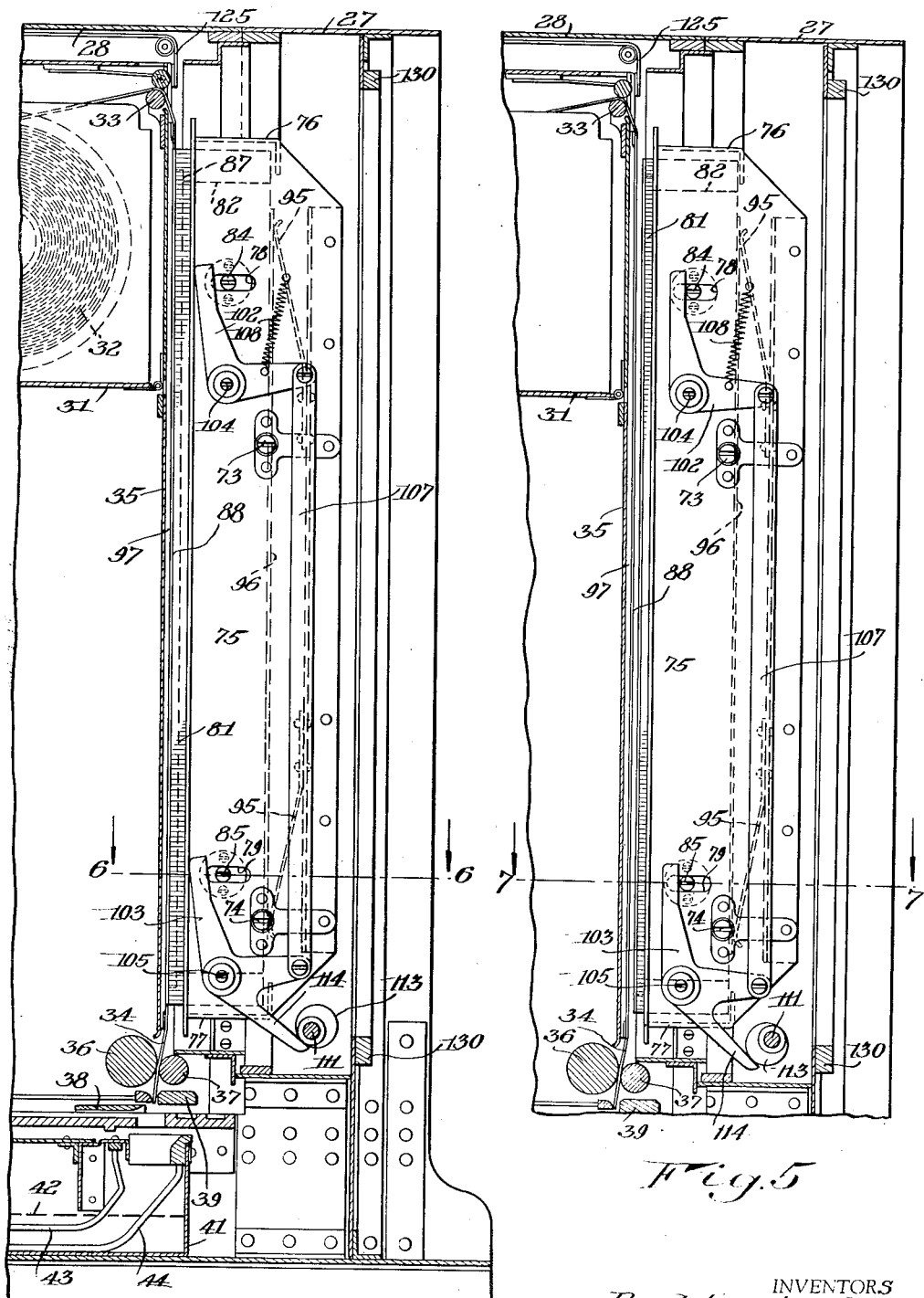

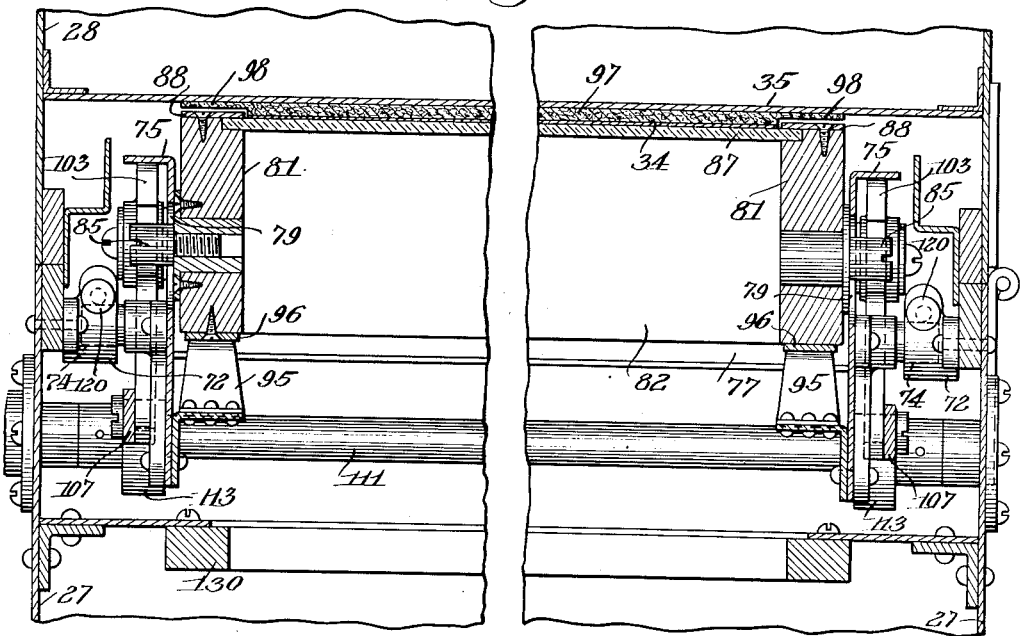
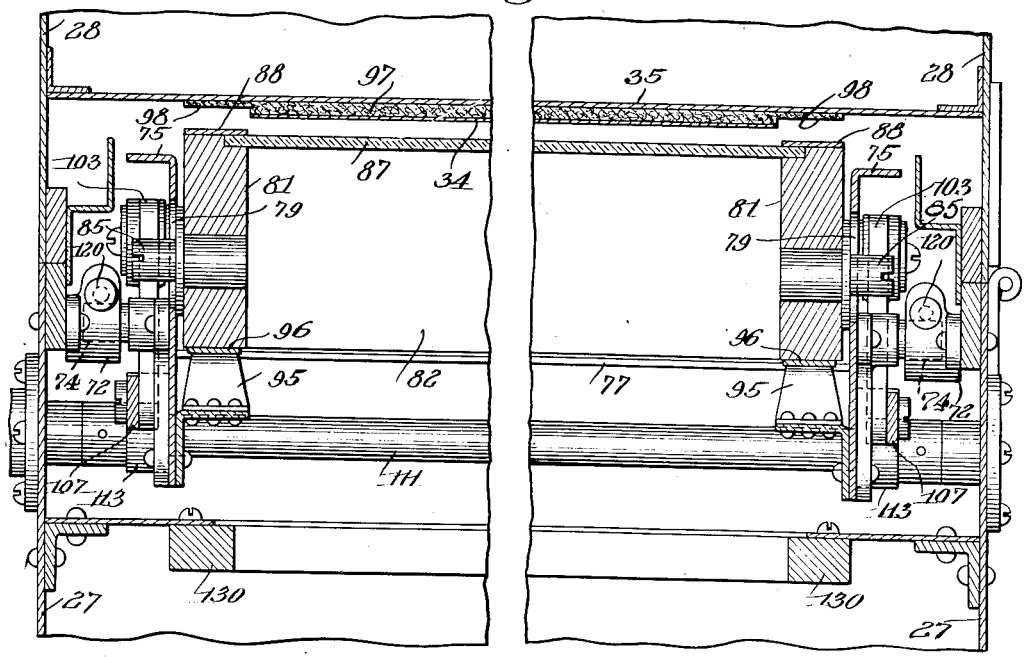

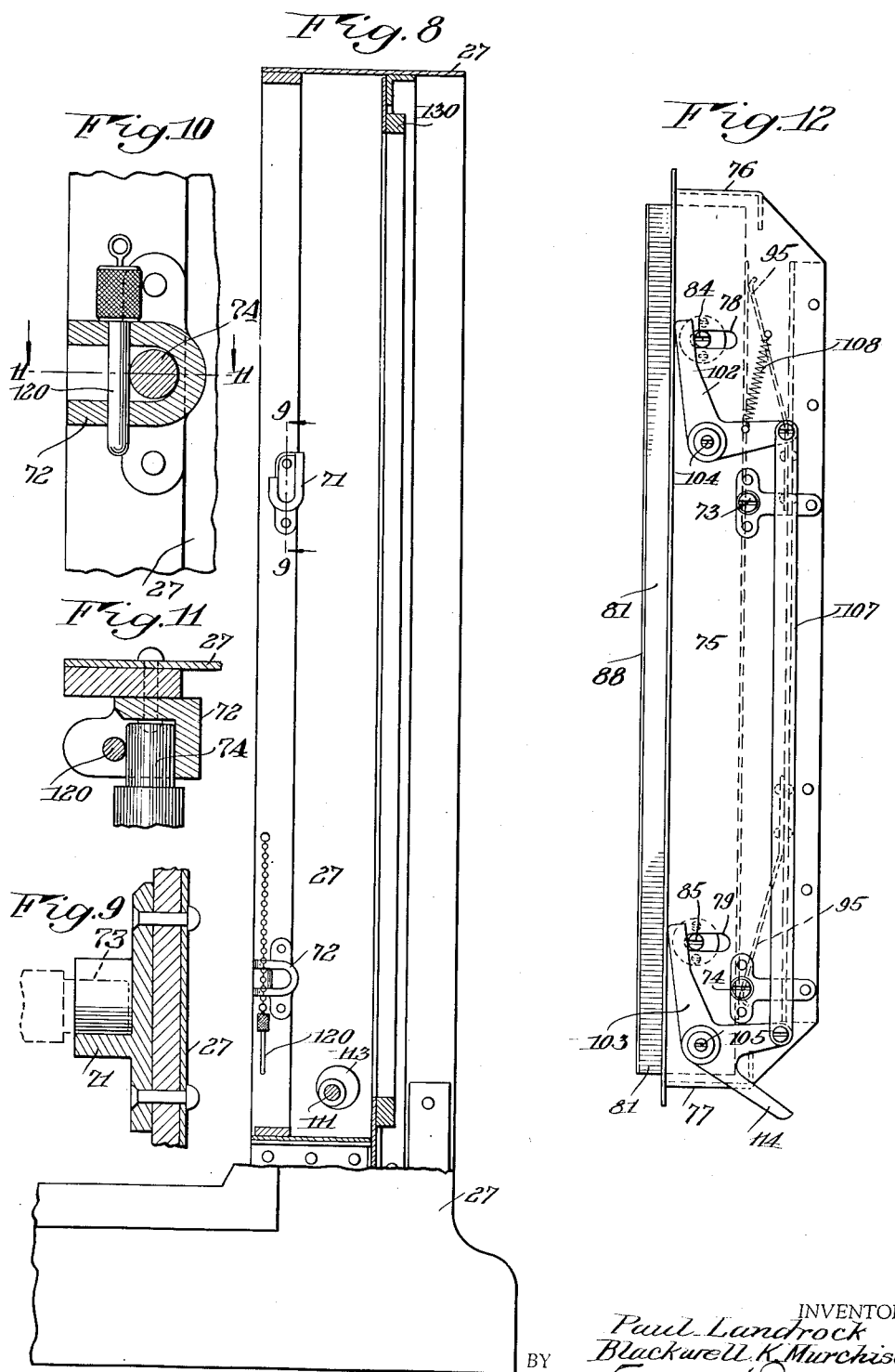

Patented Aug. 9, 1938

2,126,479

UNITED STATES PATENT OFFICE 2,126,479

PHOTOGRAPHIC APPARATUS

Paul Landrock, Rochester, and Blackwell K. Murchison, Brooklyn, N. Y., assignors to Photostat Corporation, Providence, R. I., a corporation of Rhode Island Application April 2, 1936, Serial No. 72,354

2 Claims. (Cl. 95—81)

Cuts or illustrations made by the half-tone process are commonly used in newspapers and other periodicals for advertisements. The advertiser ordering any particular advertisement frequently wishes to see a proof of his advertisement, as it will look in the half-tone cut or illustration, before giving it his final approval. Heretofore, in order to submit proofs to the advertisers, it has been necessary for the publisher of the newspaper or other periodical to go to the great expense of making a regular half-tone printing plate and printing one or more proofs therefrom for submission to the advertiser. Since the half-tone process is an expensive one, a large amount of money is spent in making the printing plates, and this is wasted if the advertiser does not approve the proof furnished to him, but desires some change to be made in the advertisement.

An object of the present invention is the provision of a simple and inexpensive apparatus for making proofs of proposed half-tone illustrations, substantially identical with those which would be secured by the usual half-tone process, at a small fraction of the cost thereof.

Still another object is the provision of an apparatus for producing, at slight expense, photographic prints simulating or having the effect of half-tone cuts or illustrations, so that such prints may be used to judge the final effect which any given advertising copy will produce when it has been subjected to the more expensive half-tone process.

A further object is the provision of apparatus of the above mentioned character, so designed and constructed that it may be easily and inexpensively applied to existing commercial cameras.

To these and other ends the invention resides in certain improvements and combinations of parts, all as will be hereinafter more fully described, the novel features being pointed out in the claims at the end of the specification.

In the drawings:

Fig. 1 is a side elevation of a fragment of a commercial camera equipped with a preferred form of apparatus of the present invention for carrying out the method of the present invention;

Fig. 2 is a diagrammatic face view of a fragment of a screen employed in the present invention;

Fig. 3 is a view of a small fragment of the screen shown in Fig. 2, on a much enlarged scale;

Fig. 4 is a vertical section taken longitudinally through a part of the photographic apparatus shown in Fig. 1, with the parts in position for making an exposure;

Fig. 5 is a view similar to a portion of Fig. 4, with the parts in position for feeding the photographic paper after the exposure has been completed;

Fig. 6 is a horizontal section taken substantially on the line 6—6 of Fig. 4;

Fig. 7 is a horizontal section taken substantially on the line 7—7 of Fig. 5;

Fig. 8 is a vertical section through a fragment of the camera body shown in Figs. 1 and 4, with the screen holder removed;

Fig. 9 is a vertical section substantially on the line 9—9 of Fig. 8, showing details of one of the supporting brackets for the screen holder;

Fig. 10 is a vertical section through another of the supporting brackets for the screen holder;

Fig. 11 is a horizontal section taken substantially on the line 11—11 of Fig. 10;

Fig. 12 is a side view of the screen holder removed from the camera body;

Fig. 13 is a rear view of the screen holder, and

Fig. 14 is a horizontal section substantially on the line 14—14 of Fig. 13.

The same reference numerals throughout the several views indicate the same parts.

According to the present invention, flexible sensitized sheet material, such as paper having a photographic emulsion on one side thereof, is placed within a suitable camera, and a screen is placed firmly against the sensitized side of the sheet material. This screen has alternating transparent and opaque areas, or alternating light-transmitting and light-obstructing areas, of minute size, the screen being somewhat similar to or identical with the screen used in the common half-tone process. The advertising "copy" of which a proof is desired is placed in the photographic field of the camera, and an exposure is made. The exposed sensitized sheet material is then removed from the focal plane of the camera, and is developed and fixed according to known photographic processes, to make a finished print which closely simulates and has practically the same appearance as a cut or illustration printed from a half-tone plate made from the same advertising "copy". Hence, this photographic print may be submitted to the advertiser to show him what his proposed advertisement will look like when reproduced in the form of a half-tone, and he can approve this photographic print or direct any desired changes in the advertising copy, before the much more expensive half-tone process is actually undertaken.

When photographic prints are made in the ordinary commercial camera, the blacks and whites are usually reversed unless a special direct-positive printing paper is employed. Thus, when the usual commercial photo copying printing paper is employed, black lines on the subject being photographed become white lines on the print, and the white background of the subject being photographed becomes a black background on the print. When it is desired to employ the usual photo copying paper (as is usually done) in carrying out the present method, then the method of the present invention includes the further steps of first making an ordinary photographic print, which may be termed a "negative" print, of the advertising copy, without the use of the screen above mentioned. This print will have the blacks and whites reversed relatively to those of the original advertising copy. Then, this negative print is placed in the photographic field of the camera and used as the subject to be photographed, and an exposure is again made, this time through the screen above mentioned. Since the blacks and whites will again be reversed by this second exposure, it follows that they will be the same as the blacks and whites of the original advertising copy, so that the print produced by this second exposure (made through the screen) is what may be termed a "positive" print, and the resulting simulation of the half-tone effect will have the blacks and whites in their true relation to each other, rather than in a reversed relation.

This method for which the present apparatus is designed, is to be distinguished from the conventional half-tone process in several important particulars. One is that when the exposure is made through the screen, the screen is placed in direct contact with the sensitized paper, rather than being spaced a slight distance away from it. Another distinction is that the exposure is made directly on a flexible sheet material, preferably sensitized paper, rather than on a stiff or inflexible sheet, such as a copper or other metal plate having a photographic emulsion thereon. Another distinction is that the present method dispenses entirely with the subsequent etching operation on the metal plate. A further distinction is the omission of the operation of printing a proof on paper from the etched metal plate, which is necessary in the half-tone process. When the photographic print made through the screen according to the present method is photographically developed and fixed, it becomes itself, a final print or proof to be submitted to the advertiser, and does not form merely a printing plate from which proofs must still be printed.

From the foregoing description it will be seen that the method above described eliminates many costly steps of the half-tone process, and employs merely a few simple and inexpensive steps, with the result of a very large saving not only of expense, but also of time.

A preferred form of apparatus for carrying out this advantageous method will now be described with reference to the drawings. Referring first to Figs. 1 and 4, the apparatus comprises a commercial camera which may be of conventional known construction, except insofar as certain parts are added as described below. The camera may include a supporting frame 21 on which is mounted a camera front 22. A lens board vertically slidable on the front 22 and adjustable to various positions thereon by a rack and pinion arrangement controlled by the hand wheel 23, carries a casing 24 containing a lens and shutter, and a prism 25 for deflecting the light rays in the usual commercial copying manner. Bellows 26 connects the front 22 to the camera body 27 slidable horizontally along the frame 21 for purposes of focusing. Hingedly mounted on the main part of the body 27 is a magazine section 28, swinging on vertical hinges arranged at the far side of the body 27 when viewed from the direction of Fig. 1, and held in closed position relatively to the body by latches 29 which may be unlatched when it is desired to swing the magazine section 28 to an open position.

Within the magazine section is a roll holder or box 31 for holding a roll 32 of suitable flexible film, such as paper having a sensitive photographic emulsion on one surface thereof. The paper passes from the roll 32 over a guide roller 33 and down at 34 over the front face of a focal plane support 35 arranged substantially vertically. At the bottom of the focal plane support are feed rollers 36 and 37 between which the paper passes, and knife blades 38 and 39 just beneath the feed rollers for cutting off the exposed portion of the paper.

A developing tray 41 is arranged with its front end approximately under the knife blades 38 and 39, and extends rearwardly therefrom. This tray is adapted to be filled with developing fluid up to about the level indicated by the dotted line 42. As the exposed paper is fed downwardly by rotation of the feeding rolls 36 and 37, the lower end of the paper enters the developing tray and wire guides 43 and 44 guide the advancing edge of the paper rearwardly and hold the sheet beneath the level of the developer 42. After the full exposed length of the sheet has been fed into the developer, the knife blades 38, 39 are operated to cut off this portion of the sheet. Meanwhile, the feeding operation has brought a fresh unexposed area of the sensitized sheet into the focal plane of the camera, which is now ready for making another exposure.

After the print has been developed a sufficient length of time in the developing tray 41, it is removed therefrom and placed in a fixing bath, and is then washed and dried, which completes the operation.

A winding crank 46, accessible at the exterior of the magazine section 28 of the camera body, is operatively connected to the feeding rollers 36 and 37, and is controlled by suitable stop mechanism of known construction so as to wind just the right amount of paper without wastage. An accessible exterior handle 48 is connected to one of the knife blades 38, 39 to operate the knife when required.

The advertising copy or other material to be reproduced may be laid conveniently upon a horizontal board or copy holder 51 mounted on a bracket 52 slidable vertically on the frame 21 and moved up or down as required by suitable mechanism including a vertical screw shaft 53 operated through gearing 54, shaft 5, and gearing 56, from a crank handle 57 conveniently accessible at the side of the frame. The shutter of the camera may be operated by a cord 58 likewise accessible at the side of the machine so that the operator standing at the side of the machine may, without moving his position, easily reach and manipulate the crank 57 for raising or lowering the copy holder 51, the cord 58 for operating the shutter to make an exposure, the handle 46 for feeding the exposed sheet material, and the handle 48 for cutting the exposed material.

The above described parts of the apparatus are substantially those of known photographic copying cameras, such as certain types of the cameras put out under the trade-mark "Photostat" by the Photostat Corporation. In order to adapt such cameras to the making of prints according to the method of the present invention, the cameras are provided with the additional parts now to be described.

Within the main body 27 of the camera are an upper pair of U-shaped brackets 71 (Fig. 8) and a lower pair of U-shaped brackets 72, the two brackets of each pair being arranged on opposite sides of the inner walls of the body 27. The brackets 71 of the upper pair are arranged substantially vertically, as shown, while the brackets 72 of the lower pair are turned on their sides or arranged substantially horizontally. The brackets 71 and 72 are adapted to receive trunnions 73 and 74, respectively, projecting from opposite sides 75 of a screen holder, which screen holder is shown by itself in Figs. 12, 13, and 14, and shown in place within the camera in Figs. 4 to 7, inclusive. The two sides 75 of the screen holder are suitably joined to each other by horizontal members 76 and 77 at top and bottom, respectively.

In each side wall 75 of the screen holder are two substantially horizontal slots 78 and 79, the former being near the top and the latter near the bottom of the screen holder. A screen frame having vertical side posts or rails 81 and suitable horizontal top and bottom rails 82 is made of a size slightly smaller than the holder 75, to fit within it as best shown in Figs. 12, 13, and 14. Pins 84 mounted in the side rails 81 project outwardly through the slots 78 in the holder 75, and similar pins 85 also mounted in the rails 81 project outwardly through the slots 79 in the holder, so that these pins serve to support the screen frame 81, 82 from the holder 75 and permit the frame to move back and forth in the holder in a horizontal direction to an extent permitted by the lengths of the slots 78 and 79.

The screen 87 is mounted in the frame 81, 82, the edges of the screen preferably being set in rabbets at the rear edges of the frame, and being held in these rabbets by overlapping plates 88. This screen 87 is a plate of glass or other suitable transparent material, having alternating transparent and opaque areas, or light-transmitting and light-obstructing areas, of minute size. The screen may be similar to or identical with the conventional screen used in the half-tone process, being made up, as indicated in Fig. 2, of a very large number of fine lines cut in one surface of the plate, and crossing each other approximately at right angles, as shown. The spaces between the lines retain their transparency, while the lines themselves are substantially opaque and form light-obstructing areas. A small fragment of the surface of such a plate, enlarged to a considerable extent, is indicated in Fig. 3, where the lines or opaque areas are shown at 91, and where the intervening transparent areas are indicated at 92.

Such a screen made of lines cut on a glass plate is quite expensive, and it is within the contemplation of the present invention to use, as a satisfactory and relatively inexpensive substitute therefor, a screen made by a photographic process. A glass plate is provided with a photographic emulsion and an exposure or photograph is made on this plate, of the lines of the more expensive screen. The exposed photographic emulsion on the second glass plate is then developed and fixed, and the result will be a glass plate having alternating transparent and opaque areas of minute size, corresponding to the original lines cut in the screen which was used as the subject of the photograph. Such a photographically reproduced screen is relatively inexpensive and is quite satisfactory for many purposes when used according to the present invention.

Flat leaf springs 95, secured within the holder 75, press rearwardly on the front edges of the side rails 81 of the screen frame, or preferably, if these side rails are made of wood, upon the metal wear plates 96 secured to these front edges. These leaf springs thus constantly tend to move the whole screen frame rearwardly, to cause the screen 87 to contact with the sensitized paper 34, as seen in Figs. 4 and 6, and to press this paper firmly against a resilient padding 97 of felt or the like, which is provided on the front face of the focal plane support 35 in order to hold all parts of the area of the paper 34 firmly against the surface of the screen 87. The side edges of the felt 97 are recessed as at 98 (Fig. 7) at points opposite the screen retaining plates 88, in order that contact between the felt and the plates 88 will not prevent firm contact between the screen and the paper.

On the outer side of each side wall 75 of the screen holder are a pair of bell cranks 102 and 103, pivoted to the holder 75 by pivots 104 and 105. The upper bell cranks 102 have upwardly extending arms which lie behind the rear sides of the screen frame pins 84 in the slot 78 and the lower bell cranks 103 have similar upwardly extending arms which lie behind the rear sides of the screen frame pins 85 which extend through the slot 79, all as best shown in Figs. 4, 5, and 12. The bell cranks also have forwardly extending arms which are connected to each other by links 107, so that the two bell cranks on each side of the holder 75 must always move together. A spring 108 connected at its upper end to a fixed pin on the holder 75 and at its lower end to a pin on the upper bell crank 102, constantly tends to turn these bell cranks in a direction to move their upwardly extending arms rearwardly, and thus to permit the screen frame pins 84 and 85 to move rearwardly under the influence of the leaf springs 95.

In order to operate the screen frame backwardly and forwardly to move the screen 87 into and out of contact with the sensitized sheet 34, there is provided a cross shaft 111 extending across the camera body 27 and having an accessible crank or handle 112 at one end. This shaft 111 is provided with two cams or eccentric portions 113, one lying in the plane of each of the two bell cranks 103 on the two sides of the screen holder. Each bell crank 103 is provided with an integral downwardly and forwardly extending arm 114 for cooperation with and actuation by its associated cam 113.

It will now be readily apparent that, when the screen holder is in normal position within the camera, as in Figs. 4 to 7, inclusive, the springs 95 and 108 normally tend to move the screen frame rearwardly to hold the screen 87 firmly against the sensitized sheet 34, in the position shown in Figs. 4 and 6. If the handle 112 be operated appropriately to turn the shaft 111, however, the cams 113 will depress the arms 114 of the bell cranks 103 and thus turn both of the lower bell cranks 103, and both of the upper bell cranks 102 connected to the lower bell cranks by the links 107. This turning of the bell cranks will cause their upwardly extending arms to push forwardly on the rear sides of the screen frame pins 84 and 85, and will move the screen frame forwardly a slight distance from the position shown in Figs. 4 and 6 to the position shown in Figs. 5 and 7. In this position the screen 87 no longer presses against the sheet material, and thus the paper strip may be easily fed by rotation of the feeding rolls 36 and 37. Then, when feeding has been completed, the shaft 111 may be turned back by appropriate manipulation of the handle 112, so that the arms 114 of the bell cranks are released, and the springs 95 and 108 will then return the parts to the positions shown in Figs. 4 and 6, in which the screen 87 bears firmly against the sensitized paper 34. Since the opaque areas of the screen are on the rear surface thereof, rather than on the front surface, they are substantially directly in contact with the sensitized paper 34. If, with the screen in this position against the paper, an exposure be now made in the manner previously described, and if the exposed sheet material be then fed downwardly into the developing pan 41 and subsequently fixed when the developing is completed, a print having the desirable half-tone effect will be produced.

When it is desired to use the photographic camera in the normal way without the use of the screen, the entire screen holder may be readily removed in a moment. Ordinarily, the holder is held in place by means of pins 120 (Figs. 8, 10, and 11) passing through appropriate holes in the U-shaped brackets 72 to hold the supporting trunnions 74 therein. If the latches 29 be unlatched and the magazine section 28 of the camera body be swung open, free access is obtained to the rear side of the screen 87 and associated parts. The pins 120 may then be removed. This releases the trunnions 74, so that the bottom of the screen holder 75 may be grasped and pulled slightly rearwardly to free the trunnions from the U-shaped brackets 72. Then the screen holder may be lifted slightly to lift the upper trunnions 73 out of the upper brackets 71, which frees the screen holder entirely from all connection with the camera and permits the screen holder, together with the screen frame and other parts supported by the screen holder, to be removed entirely from the camera and laid aside. Then if the camera body be again closed, it may be operated in the normal manner for making photographic prints in the usual way, including the preliminary negative prints above mentioned as the first step in carrying out the method of the present invention. Yet it is but the work of a moment to open up the camera again and reinsert the screen holder when it is desired to make prints through the screen.

The pressure of the springs 95 which move the screen 87 rearwardly against the sensitized paper 34 is preferably sufficiently great to hold the screen against the paper tightly enough to prevent any feeding of the paper while the screen is in the effective photographing position. In other words, the operator must first release the screen from the paper by operation of the handle 112 before he can wind the paper down into the developing bath. By making the springs 95 tight enough to prevent winding except when the screen is moved to its forward position, the apparatus is made foolproof so that an operator can not wind down the exposed sensitized strip while the screen is in contact with it, thus eliminating the possibility of abrasion marks or scratches either on the sensitized paper or on the screen which might be caused by winding the paper while the screen was in contact with it.

In order to save wastage of sensitized paper when the camera body is opened up to insert or remove the screen holder, there may be provided a curtain 125 (Figs. 4 and 5) which may, by suitable mechanism not here shown in detail, be pulled down over the front of the paper 34 on the focal plane support, when the screen 87 is spaced from the paper as in Figs. 5 and 7, before the camera body is opened. A bellows frame 130 is provided near the forward edge of the body section 27, for receiving the rear edge of the bellows 26.

While one embodiment of the apparatus according to the present invention has been disclosed, it is to be understood that the inventive idea may be carried out in a number of ways. This application is, therefore, not to be limited to the precise details described, but is intended to cover all variations and modifications thereof falling within the spirit of the invention or the scope of the appended claims.

We claim:

1. Photographic apparatus comprising a camera having a focal plane, means for holding sensitized sheet material in said focal plane in position to be exposed, a screen holder placeable in and removable from said camera, detachable means for maintaining said holder in stationary position within said camera, a screen frame movably mounted on said holder for movement toward and away from said focal plane, a screen having opaque portions and transparent portions mounted in said screen frame, resilient means tending to move said screen frame toward said focal plane to a position in which said screen is in contact with said sensitized sheet material, a shaft mounted on and bodily fixed with respect to said camera and rotatable about its own axis, said shaft having a portion within said camera and an actuating handle accessible externally of said camera, cam means on said shaft within said camera, and pivoted means mounted on and removable bodily with said screen holder for cooperation with said cam means when said holder is in place within said camera and with said screen frame to move said frame and screen away from said sensitized sheet material upon predetermined actuation of said handle.

2. Photographic apparatus comprising a camera having a focal plane, means for holding sensitized sheet material in said focal plane in position to be exposed, a screen holder removably mounted within said camera, a screen frame movably mounted on said holder for movement toward and away from said focal plane, a screen having opaque portions and transparent portions mounted in said screen frame, resilient means tending to move said screen frame toward said focal plane to a position in which said screen is in contact with said sensitized sheet material, a shaft having a portion within said camera and an actuating handle accessible externally of said camera, cam means on said shaft within said camera, and bell crank means pivotally mounted on said screen holder and removable bodily therewith when said holder is removed from said camera, said bell crank means including arms for cooperation with and actuation by said cam means and including other arms for cooperation with said screen frame to move said frame away from said sensitized sheet material against the force of said resilient means when said handle is moved to turn said shaft and cam means to a predetermined position.

PAUL LANDROCK.
BLACKWELL K. MURCHISON.